(12) United States Patent
Wang et al.

(10) Patent No.: US 12,365,376 B1
(45) Date of Patent: Jul. 22, 2025

(54) CAMPING WAGON

(71) Applicant: Hangzhou Yijiayi Cross-Border Electronic Commerce Co., Ltd., Hangzhou (CN)

(72) Inventors: Zhenhua Wang, Hangzhou (CN); Minghua Cheng, Hangzhou (CN)

(73) Assignee: HANGZHOU YUJIAYI CROSS-BORDER ELECTRONIC COMMERCE CO., LTD., Hangzhou (CN)

( * ) Notice: Subject to any disclaimer, the term of this patent is extended or adjusted under 35 U.S.C. 154(b) by 0 days.

(21) Appl. No.: 18/947,002

(22) Filed: Nov. 14, 2024

(51) Int. Cl.
*B62B 3/02* (2006.01)
*B62B 3/00* (2006.01)
*B62B 5/06* (2006.01)

(52) U.S. Cl.
CPC .............. *B62B 3/007* (2013.01); *B62B 3/025* (2013.01); *B62B 5/064* (2013.01); *B62B 2205/02* (2013.01); *B62B 2205/06* (2013.01)

(58) Field of Classification Search
CPC ...... B62B 3/025; B62B 3/007; B62B 2205/06
See application file for complete search history.

(56) References Cited

U.S. PATENT DOCUMENTS

| | | | | |
|---|---|---|---|---|
| 9,855,962 | B1 * | 1/2018 | Chen | B62B 3/025 |
| 10,272,937 | B2 * | 4/2019 | Chen | B62B 5/0003 |
| 10,953,904 | B1 * | 3/2021 | Sun | B62B 3/002 |
| 11,225,277 | B1 * | 1/2022 | Sun | B62B 5/061 |
| 11,667,313 | B2 * | 6/2023 | Wu | B62B 5/067 |
| | | | | 280/651 |
| D1,000,533 | S * | 10/2023 | Wu | D34/12 |
| D1,000,534 | S * | 10/2023 | Wu | D34/12 |
| D1,000,537 | S * | 10/2023 | Wu | D34/12 |
| D1,010,268 | S * | 1/2024 | Wu | D34/12 |
| 2018/0297622 | A1 * | 10/2018 | Chen | B62B 5/0003 |
| 2020/0283046 | A1 * | 9/2020 | Wu | B62B 3/007 |
| 2023/0406384 | A1 * | 12/2023 | Sun | B62B 3/02 |
| 2024/0051589 | A1 * | 2/2024 | Zhou | B62B 5/0438 |
| 2024/0166252 | A1 * | 5/2024 | Wu | B62B 3/002 |
| 2024/0286660 | A1 * | 8/2024 | Luo | B62B 3/022 |
| 2024/0300559 | A1 * | 9/2024 | Zhou | B62B 3/025 |
| 2024/0300560 | A1 * | 9/2024 | Zhang | B62B 3/007 |
| 2024/0400120 | A1 * | 12/2024 | Sun | B62B 5/067 |
| 2025/0042459 | A1 * | 2/2025 | Wu | B62B 5/067 |

* cited by examiner

*Primary Examiner* — Katy M Ebner
(74) *Attorney, Agent, or Firm* — Bayramoglu Law Offices LLC

(57) ABSTRACT

A camping wagon achieves high portability and large capacity. Meanwhile, the camping wagon features lower sales costs and more cost-effective packaging in the e-commerce field. In the camping wagon, each of four corners of a folding bottom frame is provided with one support rod; one first folding side frame is provided between each two adjacent support rods in a width direction of the folding bottom frame, and one second folding side frame is provided between each two adjacent support rods in a length direction of the folding bottom frame; upper side ends of two second X-shaped movable frames of the second folding side frame are respectively hinged to corresponding support rods through linkage rods; and two upper side ends of one third X-shaped movable frame of the first folding side frame are respectively hinged to corresponding support rods through linkage rods.

11 Claims, 6 Drawing Sheets

CAMPING WAGON

TECHNICAL FIELD

The present disclosure belongs to the technical field of camping wagon manufacture, and in particular relates to a camping wagon.

BACKGROUND

With the improvement of people's living standards, most travel enthusiasts prefer to stay overnight and rest in tourist destinations by camping. People will bring a lot of items when they go to the beach or camping, such as surfboards, umbrellas, tents, benches, dining tables, food, drinks and other leisure equipment. Therefore, camping wagons with both camping and cargo carrying functions are becoming increasingly popular among travel enthusiasts.

At present, the frame of the camping wagon on the market basically includes a folding bottom frame as the chassis, with vertical rods at four corners of the folding bottom frame and foldable cross frames between the vertical rods. The two ends of the cross frame are basically hinged to the top and bottom ends of the vertical rod, respectively. When the camping wagon is idle, it is folded to avoid occupying space. However, when the camping wagon is folded, the height of the cross frame is greater than the height of the support rod, resulting in a large overall height of the camping wagon. This type of camping wagon cannot minimize its volume to the greatest extent possible (at present, related products in this field can only achieve a capacity of 90-100 L, resulting in problems of large volume, small capacity, and poor practicality). Therefore, it is highly desirable to develop a camping wagon that can reduce the overall folded height of the camping wagon, minimize the space occupied by the camping wagon to the greatest extent possible, and facilitate outdoor carrying.

SUMMARY

Design Objective: To overcome the shortcomings of the prior art mentioned in the background section, the present disclosure designs a camping wagon. The present disclosure reduces the folded height of the camping wagon, achieving high portability and large capacity (The folded volume of the camping wagon is limited to 45 cm*35 cm*20 cm, and the unfolded capacity thereof reaches 150 L). Meanwhile, the camping wagon features lower sales costs and more cost-effective packaging in the e-commerce field.

Design Solution: The present disclosure aims to achieve the above design objective.

1. Upper side ends of two second X-shaped movable frames of a second folding side frame are respectively hinged to corresponding support rods through linkage rods; and upper ends of two sides of a third X-shaped movable frame of a first folding side frame are respectively hinged to corresponding support rods through linkage rods. This is a first technical feature of the present disclosure. The objective of the design is as follows. Upper side ends of two second X-shaped movable frames of a second folding side frame are respectively hinged to corresponding support rods through linkage rods; and upper ends of two sides of a third X-shaped movable frame of a first folding side frame are respectively hinged to corresponding support rods through linkage rods. Due to the linkage rods, the vertical heights of the second folding side frame and the first folding side frame will not be greater than the height of the support rod after folding. The design reduces the overall folded height of the camping wagon, minimizes the space occupied by the camping wagon to the greatest extent possible, and facilitates outdoor carrying.

2. The second folding side frame includes two first cross rods, four second cross rods, and two linkage rods; middle portions of two second cross rods are hinged to form one first X-shaped movable frame, and remaining two second cross rods are respectively hinged to corresponding first cross rods to form the two second X-shaped movable frames; an upper end of the first cross rod of one second X-shaped movable frame is hinged to an upper end of a corresponding second cross rod of the first X-shaped movable frame, and a lower end of the second cross rod of the second X-shaped movable frame is hinged to a lower end of a corresponding second cross rod of the first X-shaped movable frame; a lower end of the first cross rod is hinged to a lower part of the corresponding support rod through a hinge element; one side end of one linkage rod is hinged to an upper part of the corresponding support rod through a hinge element, and the other side end of the linkage rod is hinged to an upper end of the second cross rod of the second X-shaped movable frame; an upper end of the first cross rod of the other second X-shaped movable frame is hinged to the upper end of the corresponding second cross rod of the first X-shaped movable frame, and the lower end of the second cross rod of the second X-shaped movable frame is hinged to the lower end of the corresponding second cross rod of the first X-shaped movable frame; a lower end of the first cross rod is hinged to a lower part of the corresponding support rod through a hinge element; one side end of the other linkage rod is hinged to an upper part of the corresponding support rod through a hinge element, and the other side end of the linkage rod is hinged to the upper end of the second cross rod of the second X-shaped movable frame; and a length of the first cross rod is greater than a length of the second cross rod. This is a second technical feature of the present disclosure. The objective of the design is as follows. The second folding side frame includes two first cross rods, four second cross rods, and two linkage rods; middle portions of two second cross rods are hinged to form one first X-shaped movable frame, and remaining two second cross rods are respectively hinged to corresponding first cross rods to form the two second X-shaped movable frames; an upper end of the first cross rod of one second X-shaped movable frame is hinged to an upper end of a corresponding second cross rod of the first X-shaped movable frame, and a lower end of the second cross rod of the second X-shaped movable frame is hinged to the lower end of the corresponding second cross rod of the first X-shaped movable frame; the lower end of the first cross rod is hinged to a lower part of the corresponding support rod through a hinge element; one side end of one linkage rod is hinged to an upper part of the corresponding support rod through a hinge element, and the other side end of the linkage rod is hinged to the upper end of the second cross rod of the second X-shaped movable frame; an upper end of the first cross rod of the other second X-shaped movable frame is hinged to the upper end of the corresponding second cross rod of the first X-shaped movable frame, and the lower end of the second cross rod of the second X-shaped movable frame is hinged to the lower end of the corresponding second cross rod of the first X-shaped movable frame; a lower end of the first cross rod is hinged to a lower part of the corresponding support rod through a hinge element; one side end of the other linkage rod is hinged to an upper part of the corresponding support rod through a hinge element, and the other side end of the linkage rod is hinged to the upper end of the second cross rod of the second X-shaped movable frame; and a length of the first cross rod is greater than a length of the second cross rod. When the second folding side frame is in a folded state, an upper end surface of the first cross rod is flush with an upper end surface of the support rod, or the upper end surface of the first cross rod is lower than the upper end surface of the support rod. A distance between a hinge point of the second X-shaped movable frame and the upper end of the first cross rod of the second X-shaped movable frame matches a distance between the hinge point of the second X-shaped movable frame and the upper end of the second cross rod of the second X-shaped movable frame. The design structure of one first X-shaped movable frame and two second X-shaped movable frames reduces the overall folded height of the camping wagon while ensuring that the length of the camping wagon remains unchanged. That is, the present disclosure reduces the folded height, ensures a certain folding volume (45 cm*35 cm*20 cm), and achieves a breakthrough capacity (150 L). The camping wagon has the advantages of being more portable, having a larger capacity, lower sales costs in the e-commerce field, and more cost-effective packaging, greatly reducing transportation costs for products of the same capacity. The present disclosure further reduces the space occupied by the camping wagon, making it easier for users to carry it when going out.

3. The first folding side frame includes two first cross rods and two linkage rods; the two first cross rods are hinged to form the third X-shaped movable frame; the lower end of one first cross rod of the third X-shaped movable frame is hinged to a lower part of the corresponding support rod through a hinge element, and a lower end of the other first cross rod of the third X-shaped movable frame is hinged to a lower part of the corresponding support rod through a hinge element; one side end of one linkage rod is hinged to an upper part of the corresponding support rod through a hinge element, and the other side end of the linkage rod is hinged to an upper end of a corresponding first cross rod of the third X-shaped movable frame; and one side end of the other linkage rod is hinged to an upper part of the corresponding support rod through a hinge element, and the other side end of the linkage rod is hinged to an upper end of a corresponding first cross rod of the third X-shaped movable frame. This is a third technical feature of the present disclosure. The objective of the design is as follows. The first folding side frame includes two first cross rods and two linkage rods; the two first cross rods are hinged to form the third X-shaped movable frame; the lower end of one first cross rod of the third X-shaped movable frame is hinged to a lower part of the corresponding support rod through a hinge element, and a lower end of the other first cross rod of the third X-shaped movable frame is hinged to a lower part of the corresponding support rod through a hinge element; one side end of one linkage rod is hinged to an upper part of the corresponding support rod through a hinge element, and the other side end of the linkage rod is hinged to an upper end of a corresponding first cross rod of the third X-shaped movable frame; and one side end of the other linkage rod is hinged to an upper part of the corresponding support rod through a hinge element, and the other side end of the linkage rod is hinged to an upper end of a corresponding first cross rod of the third X-shaped movable frame. When the first folding side frame is in a folded state, an upper end surface of the first cross rod is flush with an upper end surface of the support rod, or the upper end surface of the first cross rod is lower than the upper end surface of the support rod. The design facilitates the unfolding or folding of the first folding side frame. In addition, due to the setting of the linkage rods, when the first folding side frame is folded, the upper end surface of the first cross rod is not higher than the support rod, further reducing the folded volume of the camping wagon. The design reduces the overall folded height of the camping wagon, minimizes the space occupied by the camping wagon to the greatest extent possible, and facilitates outdoor carrying.

4. One side of the hinge element is provided with a first hinge portion, and the other side of the hinge element is provided with a second hinge portion; an upper end surface of the first hinge portion is provided with a support rod mounting through hole, and the support rod mounting through hole penetrates upper and lower end surfaces of the first hinge portion; a front surface of the first hinge portion is provided with a mounting through hole, and the mounting through hole penetrates front and back surfaces of the first hinge portion; the first hinge portion is in an insertion fit with the corresponding support rod through the support rod mounting through hole; when the mounting through hole is aligned with a corresponding through hole of the support rod, the first hinge portion is mounted on the support rod through a fixing element; an upper end surface of the second hinge portion is provided with a mounting groove, and the mounting groove extends outward and penetrates an outer end surface of the second hinge portion; a front surface of the second hinge portion is provided with a pin shaft through hole that penetrates front and back surfaces of the second hinge portion; the pin shaft through hole passes through the mounting groove; one end of the linkage rod hinged to the corresponding second hinge portion is provided with a linkage rod through hole; when one end of the linkage rod is located in the mounting groove of the corresponding second hinge portion and the pin shaft through hole is aligned with the linkage rod through hole, the linkage rod is hinged to the corresponding second hinge portion through a pin shaft; one end of the first cross rod hinged to the corresponding second hinge portion is provided with a first cross rod through hole; and when one end of the first cross rod is located in the mounting groove of the corresponding second hinge portion and the pin shaft through hole is aligned with the first cross rod through hole, the first cross rod is hinged to the corresponding second hinge portion through a pin shaft. This is a fourth technical feature of the present disclosure. The objective of the design is as follows. One side of the hinge element is provided with a first hinge portion, and the other side of the hinge element is provided with a second hinge portion; an upper end surface of the first hinge portion is provided with a support rod mounting through hole, and the support rod mounting through hole penetrates upper and lower end surfaces of the first hinge portion; a front surface of the first hinge portion is provided with a mounting through hole, and the mounting through hole penetrates front and back surfaces of the first hinge portion; the first hinge portion is in an insertion fit with the corresponding support rod through the support rod mounting through hole; when the mounting through hole is aligned with a corresponding through hole of the support rod, the first hinge portion is mounted on the support rod through a fixing element; an upper end surface of the second hinge portion is provided with a mounting groove, and the mounting groove extends outward and penetrates an outer end surface of the second hinge portion; a front surface of the second hinge portion is provided with a pin shaft through hole that penetrates front and back surfaces of the second hinge portion; the pin shaft through hole passes through the mounting groove; one end of the linkage rod hinged to the corresponding second hinge portion is provided with a linkage rod through hole; when one end of the linkage rod is located in the mounting groove of the corresponding second hinge portion and the pin shaft through hole is aligned with the linkage rod through hole, the linkage rod is hinged to the corresponding second hinge portion through a pin shaft; one end of the first cross rod hinged to the corresponding second hinge portion is provided with a first cross rod through hole; and when one end of the first cross rod is located in the mounting groove of the corresponding second hinge portion and the pin shaft through hole is aligned with the first cross rod through hole, the first cross rod is hinged to the corresponding second hinge portion through a pin shaft. When the second folding side frame is in an unfolded state, a lower surface of the first cross rod of the second folding side frame is abutted against a bottom of the corresponding mounting groove, and a lower surface of the linkage rod of the second folding side frame is abutted against a bottom of the corresponding mounting groove. When the first folding side frame is in an unfolded state, a lower surface of the first cross rod of the first folding side frame is abutted against a bottom of the corresponding mounting groove, and a lower surface of the linkage rod of the first folding side frame is abutted against a bottom of the corresponding mounting groove. The lower surface of the first cross rod is abutted against a bottom of the corresponding mounting groove, that is, the mounting groove is abutted against the first cross rod in a limited manner. The lower surface of the linkage rod is abutted against a bottom of the corresponding mounting groove, that is, the mounting groove is abutted against the linkage rod in a limited manner. In this way, the design improves the hinge stability at the hinge point when the second folding side frame or the first folding side frame is in an unfolded state, thereby enhancing the usability of the camping wagon.

5. A folding frame is provided with a handle assembly; the handle assembly includes a mounting rod and a handle rod; the mounting rod is provided between the two support rods in the width direction of the folding bottom frame, and the handle rod is provided at a middle portion of the mounting rod; each of two ends of the mounting rod is provided with one rotating element; each of the two support rods is provided with one connecting element; a rotating space is formed inside the connecting element, and the rotating element is rotatably provided in the corresponding rotating space; the mounting rod includes a left mounting rod, a right mounting rod, and a connecting portion provided between the left mounting rod and the right mounting rod; one end of the left mounting rod and one end of the right mounting rod are respectively hinged to corresponding rotating elements; two sides of an upper end surface of the connecting portion are respectively provided with connecting grooves, and the connecting grooves extend outward and penetrate outer end surfaces of corresponding ends; the other end of the left mounting rod and the other end of the right mounting rod are respectively hinged in the corresponding connecting grooves; a bottom end of the handle rod is fixedly provided on an upper part of the connecting portion; and when the handle assembly is in an unfolded state, a lower surface of the left mounting rod is abutted against a bottom of the corresponding connecting groove, and a lower surface of the right mounting rod is abutted against a bottom of the corresponding connecting groove. This is a fifth technical feature of the present disclosure. The objective of the design is as follows. The folding frame is provided with a handle assembly; the handle assembly includes a mounting rod and a handle rod; the mounting rod is provided between the two support rods in the width direction of the folding bottom frame, and the handle rod is provided at a middle portion of the mounting rod; each of two ends of the mounting rod is provided with one rotating element; each of the two support rods is provided with one connecting element; a rotating space is formed inside the connecting element, and the rotating element is rotatably provided in the corresponding rotating space; the mounting rod includes a left mounting rod, a right mounting rod, and a connecting portion provided between the left mounting rod and the right mounting rod; one end of the left mounting rod and one end of the right mounting rod are respectively hinged to corresponding rotating elements; two sides of an upper end surface of the connecting portion are respectively provided with connecting grooves, and the connecting grooves extend outward and penetrate outer end surfaces of corresponding ends; the other end of the left mounting rod and the other end of the right mounting rod are respectively hinged in the corresponding connecting grooves; a bottom end of the handle rod is fixedly provided on an upper part of the connecting portion; and when the handle assembly is in an unfolded state, a lower surface of the left mounting rod is abutted against a bottom of the corresponding connecting groove, and a lower surface of the right mounting rod is abutted against a bottom of the corresponding connecting groove. First, the user can control the tilt of the handle rod at a certain angle, making it convenient for the user to move the camping wagon by pulling the handle rod. Therefore, it is effort-saving for the user to move items by the camping wagon. Second, before folding the camping wagon, the user can press down the handle rod to tilt the left mounting rod and the right mounting rod to a certain extent. The two support rods used for mounting the mounting rods approach each other, such that the left mounting rod and the right mounting rod approach each other, thereby completing the folding. The design reduces the overall folded volume of the camping wagon. After the user unfolds the camping wagon, the lower surface of the left mounting rod or the right mounting rod is abutted against the bottom of the connecting groove. When the user pulls the camping wagon by pulling the handle rod, the left mounting rod and the right mounting rod will not be folded, thereby enhancing the usability of the camping wagon.

Technical Solution: A camping wagon includes a camping wagon body, where a folding frame of the camping wagon body includes a folding bottom frame, two first folding side frames, two second folding side frames, and four support rods; each of four corners of the folding bottom frame is provided with one support rod; one first folding side frame is provided between each two adjacent support rods in a width direction of the folding bottom frame, and one second folding side frame is provided between each two adjacent support rods in a length direction of the folding bottom frame; upper side ends of two second X-shaped movable frames of the second folding side frame are respectively hinged to corresponding support rods through linkage rods; and two upper side ends of one third X-shaped movable frame of the first folding side frame are respectively hinged to corresponding support rods through linkage rods.

Compared with the prior art mentioned in the background section, the present disclosure designs a camping wagon. The present disclosure reduces the folded height of the camping wagon, achieving high portability and large capacity (The folded volume of the camping wagon is limited to 45 cm*35 cm*20 cm, and the unfolded capacity thereof reaches 150 L). Meanwhile, the camping wagon features lower sales costs and more cost-effective packaging in the e-commerce field.

DETAILED DESCRIPTION OF THE EMBODIMENTS

Figure 1:
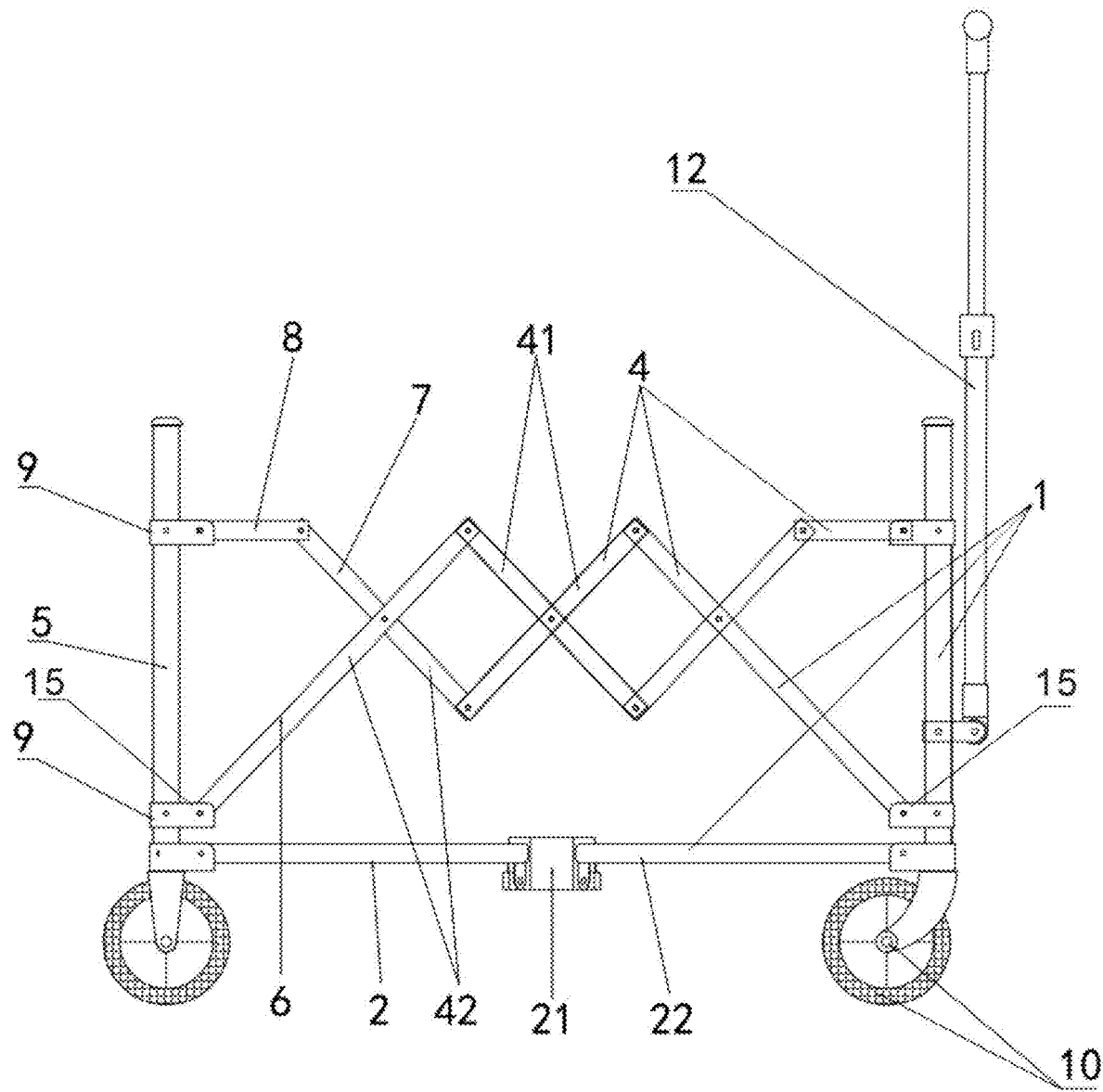
FIG. 1 is a side view of a camping wagon (without a fabric cover) according to the present disclosure.
Figure 2:
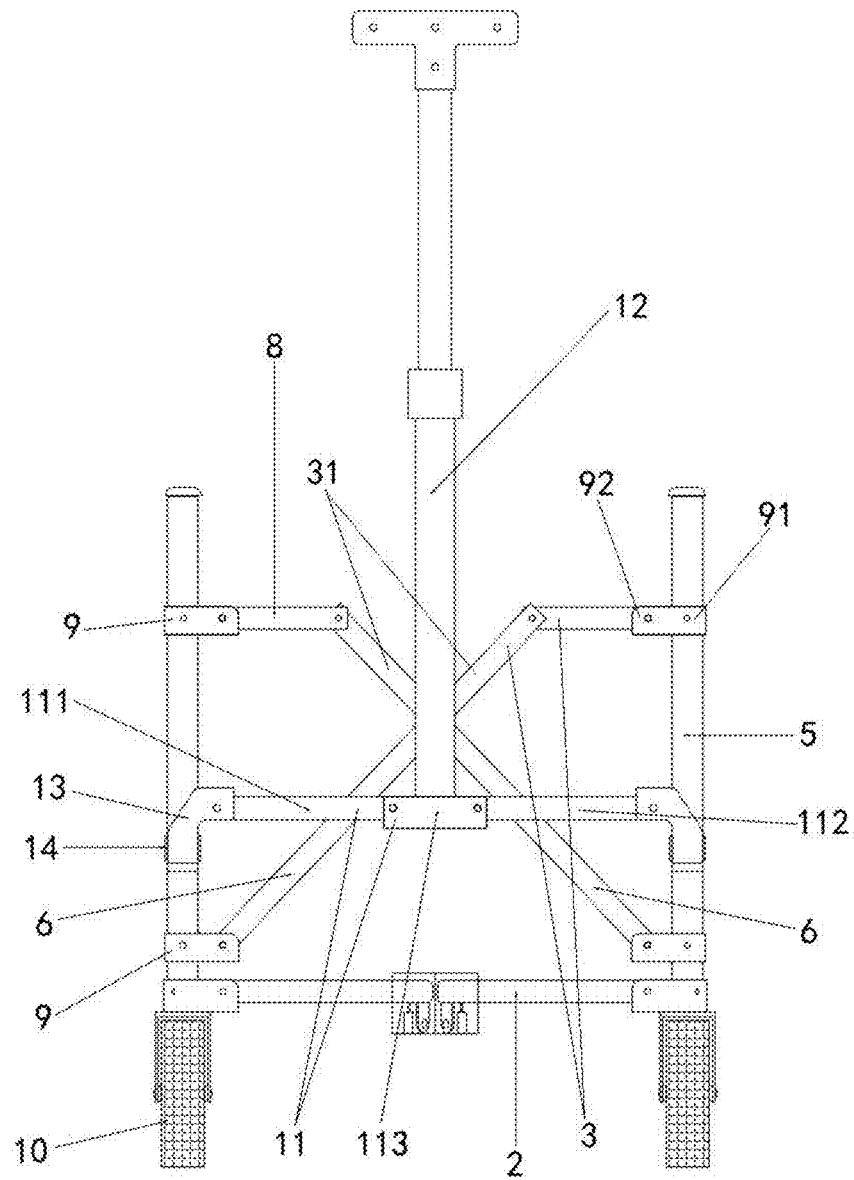
FIG. 2 is a front view of the camping wagon (without a fabric cover) according to the present disclosure.
Figure 3:
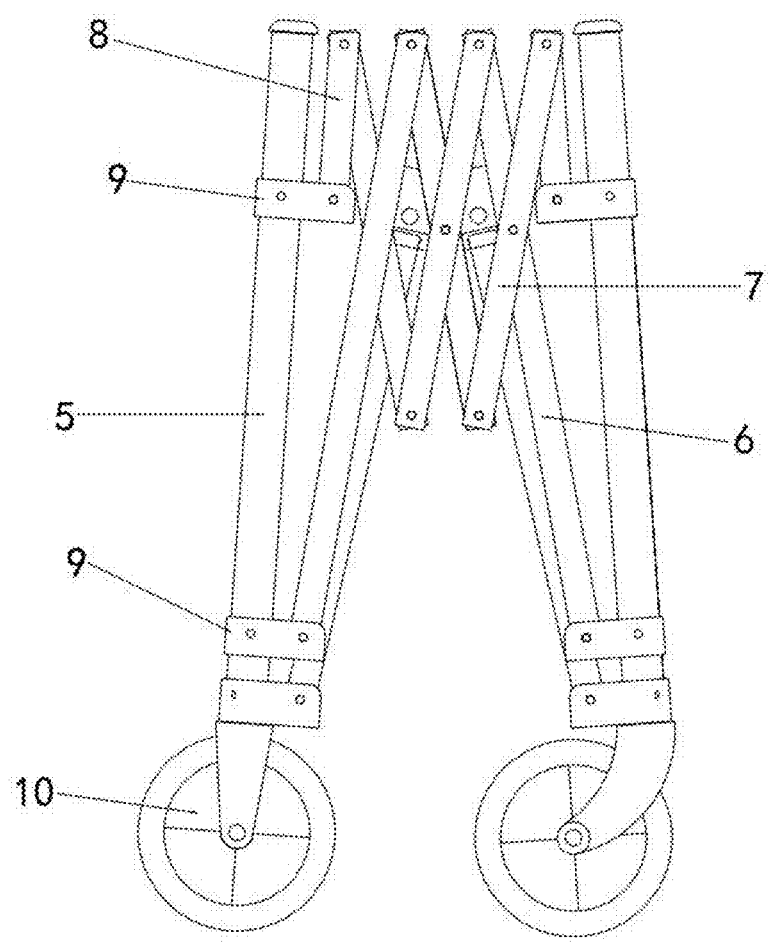
FIG. 3 is a section view of the camping wagon (without a fabric cover or a handle assembly) in a folded state according to the present disclosure.
Figure 4:
FIG. 4 is a picture of a real camping wagon (with a fabric cover) according to the present disclosure.
Figure 5:
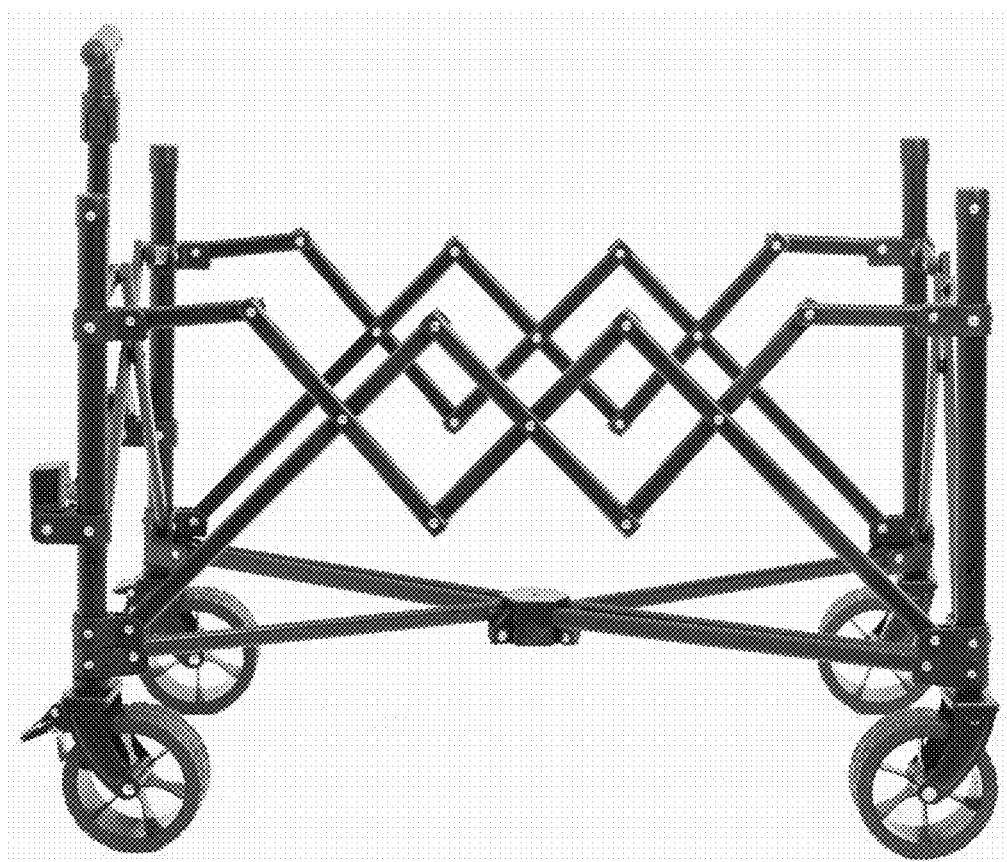
FIG. 5 is a picture of the real camping wagon (without the fabric cover) according to the present disclosure.
Figure 6:
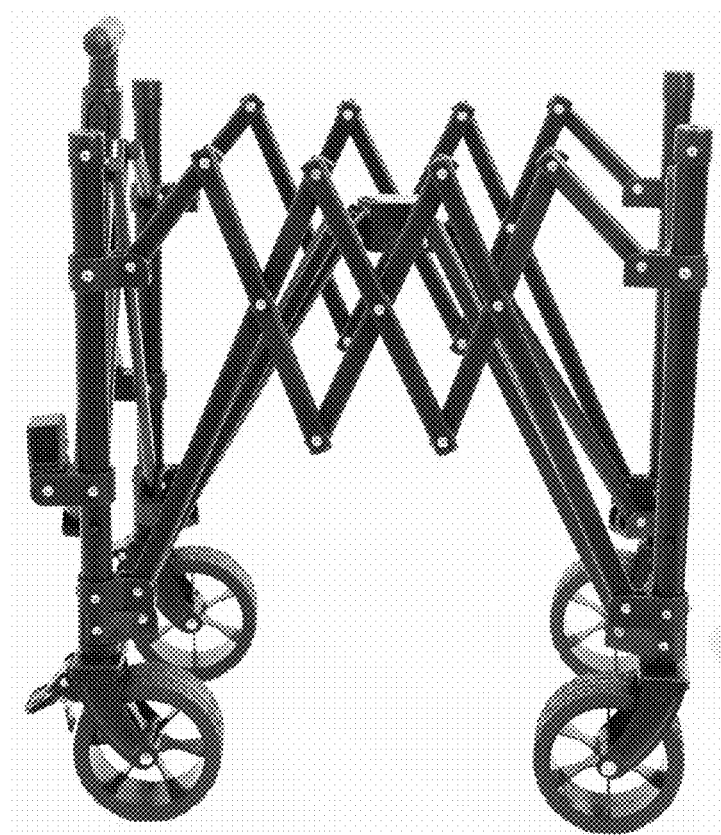
FIG. 6 is a picture of the real camping wagon (without the fabric cover) in a folded state according to the present disclosure.

Embodiment 1: Referring to FIGS. 1 and 6, a camping wagon includes a camping wagon body. Folding frame 1 of the camping wagon body includes folding bottom frame 2, two first folding side frames 3, two second folding side frames 4, and four support rods 5. Each of four corners of the folding bottom frame 2 is provided with one support rod 5. One first folding side frame 3 is provided between each two adjacent support rods 5 in a width direction of the folding bottom frame 2, and one second folding side frame 4 is provided between each two adjacent support rods 5 in a length direction of the folding bottom frame 2. Upper side ends of two second X-shaped movable frames 42 of the second folding side frame 4 are respectively hinged to corresponding support rods 5 through linkage rods 8. Two upper side ends of one third X-shaped movable frame 31 of the first folding side frame 3 are respectively hinged to corresponding support rods 5 through linkage rods 8.

The second folding side frame 4 includes two first cross rods 6, four second cross rods 7, and two linkage rods 8. Middle portions of two second cross rods 7 are hinged to form one first X-shaped movable frame 41, and remaining two second cross rods 7 are respectively hinged to corresponding first cross rods 6 to form the two second X-shaped movable frames 42. An upper end of the first cross rod 6 of one second X-shaped movable frame 42 is hinged to an upper end of a corresponding second cross rod 7 of the first X-shaped movable frame 41, and a lower end of the second cross rod 7 of the second X-shaped movable frame 42 is hinged to a lower end of a corresponding second cross rod 7 of the first X-shaped movable frame 41. A lower end of the first cross rod 6 is hinged to a lower part of the corresponding support rod 5 through hinge element 9. One side end of one linkage rod 8 is hinged to an upper part of the corresponding support rod 5 through a hinge element 9, and the other side end of the linkage rod 8 is hinged to an upper end of the second cross rod 7 of the second X-shaped movable frame 42. An upper end of the first cross rod 6 of the other second X-shaped movable frame 42 is hinged to the upper end of the corresponding second cross rod 7 of the first X-shaped movable frame 41, and the lower end of the second cross rod 7 of the second X-shaped movable frame 42 is hinged to the lower end of the corresponding second cross rod 7 of the first X-shaped movable frame 41. A lower end of the first cross rod 6 is hinged to a lower part of the corresponding support rod 5 through a hinge element 9. One side end of the other linkage rod 8 is hinged to an upper part of the corresponding support rod 5 through a hinge element 9, and the other side end of the linkage rod 8 is hinged to the upper end of the second cross rod 7 of the second X-shaped movable frame 42. A length of the first cross rod 6 is greater than a length of the second cross rod 7.

When the second folding side frame 4 is in a folded state, an upper end surface of the first cross rod 6 is flush with an upper end surface of the support rod 5, or the upper end surface of the first cross rod 6 is lower than the upper end surface of the support rod 5. A distance between a hinge point of the second X-shaped movable frame 42 and the upper end of the first cross rod 7 of the second X-shaped movable frame 42 matches a distance between the hinge point of the second X-shaped movable frame 42 and the upper end of the second cross rod 7 of the second X-shaped movable frame 42.

After using the camping wagon, the user can fold the folding bottom frame 2, thereby driving the four support rods 5 to move inward together. The first folding side frame 3 and the second folding side frame 4 are provided between each two adjacent support rods 5. When the two adjacent support rods 5 approach each other, the first folding side frame 3 or the second folding side frame 4 provided between the two adjacent support rods 5 is folded, thereby completing the folding of the camping wagon.

The folding bottom frame 2 includes folding element 21 and four bottom rods 22. Two ends of the bottom rod 22 are hinged to the folding element 21 and the support rod 5, respectively. The folding element 21 is driven to move upwards, thereby driving one end of the bottom rod 22 to move upwards. The other end of the bottom rod 22 drives the support rod 5 to approach one another, thereby completing the folding. After using the camping wagon, the user can pull the folding element 21 upwards, thereby driving the end of the bottom rod 22 hinged to the folding element 21 to move upwards. At this point, the other ends of the four bottom rods 22 move inward and slowly approach each other, thereby driving the four support rods 5 to move inward together, completing the folding of the camping wagon. The folding method is fast and convenient, and the user does not need to remove the folding bottom frame 2 from the camping wagon to complete the folding of the camping wagon, making the operation easy and effortless.

The first folding side frame 3 includes two first cross rods 6 and two linkage rods 8. The two first cross rods 6 are hinged to form the third X-shaped movable frame 31. The lower end of one first cross rod 6 of the third X-shaped movable frame 31 is hinged to a lower part of the corresponding support rod 5 through a hinge element 9, and a lower end of the other first cross rod 6 of the third X-shaped movable frame 31 is hinged to a lower part of the corresponding support rod 5 through a hinge element 9. One side end of one linkage rod 8 is hinged to an upper part of the corresponding support rod 5 through a hinge element 9, and the other side end of the linkage rod 8 is hinged to an upper end of a corresponding first cross rod 6 of the third X-shaped movable frame 31. One side end of the other linkage rod 8 is hinged to an upper part of the corresponding support rod 5 through a hinge element 9, and the other side end of the linkage rod 8 is hinged to an upper end of a corresponding first cross rod 6 of the third X-shaped movable frame 31.

When the first folding side frame 3 is in a folded state, the upper end surface of the first cross rod 6 is flush with the upper end surface of the support rod 5, or the upper end surface of the first cross rod 6 is lower than the upper end surface of the support rod 5.

One side of the hinge element 9 is provided with first hinge portion 91, and the other side of the hinge element 9 is provided with second hinge portion 92. An upper end surface of the first hinge portion 91 is provided with a support rod mounting through hole, and the support rod mounting through hole penetrates upper and lower end surfaces of the first hinge portion 91. A front surface of the first hinge portion 91 is provided with a mounting through hole, and the mounting through hole penetrates front and back surfaces of the first hinge portion 91. The first hinge portion 91 is in an insertion fit with the corresponding support rod 5 through the support rod mounting through hole. When the mounting through hole is aligned with a corresponding through hole of the support rod, the first hinge portion 91 is mounted on the support rod 5 through a fixing element (rivet). An upper end surface of the second hinge portion 92 is provided with a mounting groove 15, and the mounting groove 15 extends outward and penetrates an outer end surface of the second hinge portion 92. A front surface of the second hinge portion 92 is provided with a pin shaft through hole that penetrates front and back surfaces of the second hinge portion 92. The pin shaft through hole passes through the mounting groove 15. One end of the linkage rod 8 hinged to the corresponding second hinge portion 92 is provided with a linkage rod through hole. When one end of the linkage rod 8 is located in the mounting groove 15 of the corresponding second hinge portion 92 and the pin shaft through hole is aligned with the linkage rod through hole, the linkage rod 8 is hinged to the corresponding second hinge portion 92 through a pin shaft. One end of the first cross rod 6 hinged to the corresponding second hinge portion 92 is provided with a first cross rod through hole. When one end of the first cross rod 6 is located in the mounting groove 15 of the corresponding second hinge portion 92 and the pin shaft through hole is aligned with the first cross rod through hole, the first cross rod 6 is hinged to the corresponding second hinge portion 92 through a pin shaft.

When the second folding side frame 4 is in an unfolded state, a lower surface of the first cross rod 6 of the second folding side frame 4 is abutted against a bottom of the corresponding mounting groove 15, and a lower surface of the linkage rod 8 of the second folding side frame 4 is abutted against a bottom of the corresponding mounting groove 15. When the first folding side frame 3 is in an unfolded state, a lower surface of the first cross rod 6 of the first folding side frame 3 is abutted against a bottom of the corresponding mounting groove 15, and a lower surface of the linkage rod 8 of the first folding side frame 3 is abutted against a bottom of the corresponding mounting groove 15. The lower surface of the first cross rod 6 is abutted against a bottom of the corresponding mounting groove 15, that is, the mounting groove 15 is abutted against the first cross rod 6 in a limited manner. The lower surface of the linkage rod 8 is abutted against a bottom of the corresponding mounting groove 15, that is, the mounting groove 15 is abutted against the linkage rod 8 in a limited manner. In this way, the design improves the hinge stability at the hinge point when the second folding side frame 4 or the first folding side frame 3 is in an unfolded state, thereby enhancing the usability of the camping wagon.

A bottom of each of the four support rods 5 is provided with wheel assembly 10. The wheel assembly 10 is a prior art and will not be further described here. The wheel assembly 10 makes it convenient for the user to transport items by the camping wagon.

The folding frame 1 is provided with a handle assembly. The handle assembly includes mounting rod 11 and a handle rod 12. The mounting rod 11 is provided between the two support rods 5 in the width direction of the folding bottom frame 2, and the handle rod 12 is provided at a middle portion of the mounting rod 11. Each of two ends of the mounting rod 11 is provided with one rotating element 13. Each of the two support rods 5 is provided with one connecting element 14. A rotating space is formed inside the connecting element 14, and the rotating element 13 is rotatably provided in the corresponding rotating space. In this way, the user can control the tilt of the handle rod 12 at a certain angle, making it convenient for the user to move the camping wagon by pulling the handle rod 12. Therefore, it is effort-saving for the user to move items by the camping wagon.

The mounting rod 11 includes left mounting rod 111, right mounting rod 112, and connecting portion 113 provided between the left mounting rod 111 and the right mounting rod 112. One end of the left mounting rod 111 and one end of the right mounting rod 112 are respectively hinged to corresponding rotating elements 13. Two sides of an upper end surface of the connecting portion 113 are respectively provided with connecting grooves, and the connecting grooves extend outward and penetrate outer end surfaces of corresponding ends. The other end of the left mounting rod 111 and the other end of the right mounting rod 112 are respectively hinged in the corresponding connecting grooves. A bottom end of the handle rod 12 is fixedly provided on an upper part of the connecting portion 113.

When the handle assembly is in an unfolded state, a lower surface of the left mounting rod 111 is abutted against a bottom of the corresponding connecting groove, and a lower surface of the right mounting rod 112 is abutted against a bottom of the corresponding connecting groove.

Before folding the camping wagon, the user can press down the handle rod 12 to tilt the left mounting rod 111 and the right mounting rod 112 to a certain extent. The two support rods 5 used for mounting the mounting rods approach each other, such that the left mounting rod 111 and the right mounting rod 112 approach each other, thereby completing the folding. The design reduces the overall folded volume of the camping wagon. After the user unfolds the camping wagon, the lower surface of the left mounting rod 111 or the right mounting rod 112 is abutted against the bottom of the connecting groove. When the user pulls the camping wagon by pulling the handle rod 12, the left mounting rod 111 and the right mounting rod 112 will not be folded, thereby avoiding affecting the user's normal use.

It should be understood that although detailed text descriptions of the design idea of the present disclosure are made based on the above embodiments, these text descriptions are merely intended to briefly illustrate, rather than to limit, the design idea of the present disclosure. Therefore, any combination, addition, or modification made without departing from the design idea of the present disclosure should fall within the protection scope of the present disclosure.

What is claimed is:

1. A camping wagon, comprising a camping wagon body, wherein a folding frame of the camping wagon body comprises a folding bottom frame, two first folding side frames, two second folding side frames, and four support rods; each of four corners of the folding bottom frame is provided with one support rod; each of the two first folding side frames is provided between each two adjacent support rods in a width direction of the folding bottom frame, and each of the two second folding side frames is provided between each two adjacent support rods in a length direction of the folding bottom frame; wherein each of the two second folding side frames comprises a first X-shaped moveable frame and two second X-shaped moveable frames, and each of the two first folding side frames comprises a third X-shaped moveable frame; upper side ends of the two second X-shaped movable frames of each of the second folding side frames are respectively hinged to corresponding support rods of the four support rods; and two upper side ends of the third X-shaped movable frame of each of the first folding side frames is respectively hinged to corresponding support rods of the four support rods, wherein each of the first folding side frames comprises two first cross rods and two linkage rods; the two first cross rods are hinged to form the third X-shaped movable frame; a lower end of one of the two first cross rods of the third X-shaped movable frame is hinged to a lower part of a corresponding support rod through a corresponding first hinge element of a plurality of hinge elements, and a lower end of the other of the two first cross rods of the third X-shaped movable frame is hinged to a lower part of an adjacent support rod of the corresponding support rod through a corresponding second hinge element of the plurality of hinge elements; a first side end of one of the two linkage rods is hinged to an upper part of the corresponding support rod through a corresponding third hinge element of the plurality of hinge elements, and a second side end of the one of the two linkage rods is hinged to an upper end of the one of the two first cross rods of the third X-shaped movable frame; and a first side end of the other linkage rod of the two linkage rods is hinged to an upper part of the adjacent support rod through a corresponding fourth hinge element of the plurality of hinge elements, and a second side end of the other linkage rod of the two linkage rods is hinged to an upper end of the other of the two first cross rods of the third X-shaped movable frame, wherein when the two first folding side frames are in a folded state, an upper end surface of the first cross rods are flush with an upper end surface of the support rods, or the upper end surface of the first cross rods is lower than the upper end surface of the support rods.

2. The camping wagon according to claim 1, wherein each of the two second folding side frames comprise two first cross rods, four second cross rods, and two linkage rods; middle portions of two of the four second cross rods are hinged to form the first X-shaped movable frame, and remaining two of the four second cross rods each is respectively hinged to a corresponding first cross rod of the two first cross rods to form the two second X-shaped movable frames; an upper end of the first cross rod of one of the two second X-shaped movable frames is hinged to an upper end of a corresponding second cross rod of the first X-shaped movable frame, and a lower end of the second cross rod of the one of the second X-shaped movable frames is hinged to a lower end of a corresponding second cross rod of the first X-shaped movable frame; a lower end of the first cross rod of the one of the two second X-shaped moveable frames is hinged to a lower part of a corresponding support rod through a corresponding fifth hinge element of the plurality of hinge elements; a first side end of one of the two linkage rods is hinged to an upper part of the corresponding support rod through a corresponding sixth hinge element of the plurality of hinge elements, and a second side end of the one of the two linkage rods is hinged to an upper end of the second cross rod of the one of the two second X-shaped movable frame; an upper end of the first cross rod of the other second X-shaped movable frame is hinged to the upper end of a corresponding second cross rod of the first X-shaped movable frame, and a lower end of the second cross rod of the other second X-shaped movable frame is hinged to the lower end of a corresponding second cross rod of the first X-shaped movable frame; a lower end of the first cross rod of the other second X-shaped moveable frame is hinged to a lower part of a corresponding support rod through a corresponding seventh hinge element of the plurality of hinge elements; a first side end of the other of the two linkage rods is hinged to an upper part of the corresponding support rod through a corresponding eighth hinge element of the plurality of hinge elements, and a second side end of the other of the two linkage rods is hinged to an upper end of the second cross rod of the other second X-shaped movable frame; and a length of each of the two first cross rods is greater than a length of each of the second cross rods.

3. The camping wagon according to claim 2, wherein a first side of each hinge element of the plurality of hinge elements is provided with a first hinge portion, and a second side of each hinge element is provided with a second hinge portion; an upper end surface of the first hinge portion is provided with a support rod mounting through hole, and the support rod mounting through hole penetrates upper and lower end surfaces of the first hinge portion; a front surface of the first hinge portion is provided with a mounting through hole, and the mounting through hole penetrates front and back surfaces of the first hinge portion; the first hinge portion is in an insertion fit with the corresponding support rod through the support rod mounting through hole; when the mounting through hole is aligned with a corresponding through hole of the support rod, the first hinge portion is mounted on the support rod through a fixing element; an upper end surface of the second hinge portion is provided with a mounting groove, and the mounting groove extends outward and penetrates an outer end surface of the second hinge portion; a front surface of the second hinge portion is provided with a pin shaft through hole that penetrates front and back surfaces of the second hinge portion; the pin shaft through hole passes through the mounting groove; one end of each of the two linkage rods is hinged to the corresponding second hinge portion and is provided with a linkage rod through hole; when one end of each of the two linkage rods is located in the mounting groove of the corresponding second hinge portion and the pin shaft through hole is aligned with the linkage rod through hole, each of the linkage rods is hinged to the corresponding second hinge portion through a pin shaft; one end of each of the two first cross rods is hinged to the corresponding second hinge portion and is provided with a first cross rod through hole; and when one end of each of the two first cross rods is located in the mounting groove of the corresponding second hinge portion and the pin shaft through hole is aligned with the first cross rod through hole, each of the two first cross rods is hinged to the corresponding second hinge portion through a pin shaft.

4. The camping wagon according to claim 3, wherein when each of the two second folding side frames is in an unfolded state, a lower surface of each of the first cross rods of each of the two second folding side frame is abutted against a bottom of the corresponding mounting groove, and a lower surface of each of the linkage rods of each of the two second folding side frames is abutted against a bottom of the corresponding mounting groove; and when each of the two first folding side frames provided between each two adjacent support rods in a width direction of the folding bottom frame is in an unfolded state, a lower surface of each of the first cross rods of each of the two first folding side frames is abutted against a bottom of the corresponding mounting groove, and a lower surface of each of the linkage rods of each of the two first folding side frames is abutted against a bottom of the corresponding mounting groove.

5. The camping wagon according to claim 1, wherein for each hinge element of the plurality of hinge elements, a first side of each hinge element is provided with a first hinge portion, and a second side of each hinge element is provided with a second hinge portion; an upper end surface of the first hinge portion is provided with a support rod mounting through hole, and the support rod mounting through hole penetrates upper and lower end surfaces of the first hinge portion; a front surface of the first hinge portion is provided with a mounting through hole, and the mounting through hole penetrates front and back surfaces of the first hinge portion; the first hinge portion is in an insertion fit with the corresponding support rod through the support rod mounting through hole; when the mounting through hole is aligned with a corresponding through hole of the support rod, the first hinge portion is mounted on the support rod through a fixing element; an upper end surface of the second hinge portion is provided with a mounting groove, and the mounting groove extends outward and penetrates an outer end surface of the second hinge portion; a front surface of the second hinge portion is provided with a pin shaft through hole that penetrates front and back surfaces of the second hinge portion; the pin shaft through hole passes through the mounting groove; one end of each of the two linkage rods is hinged to the corresponding second hinge portion and is provided with a linkage rod through hole; when one end of each of the two linkage rods is located in the mounting groove of the corresponding second hinge portion and the pin shaft through hole is aligned with the linkage rod through hole, each of the two linkage rods is hinged to the corresponding second hinge portion through a pin shaft; one end of each of the two first cross rods is hinged to the corresponding second hinge portion and is provided with a first cross rod through hole; and when one end of each of the two first cross rods is located in the mounting groove of the corresponding second hinge portion and the pin shaft through hole is aligned with the first cross rod through hole, each of the two first cross rods is hinged to the corresponding second hinge portion through a pin shaft.

6. The camping wagon according to claim 1, wherein a bottom of each of the four support rods is provided with a wheel assembly.

7. The camping wagon according to claim 1, wherein the folding frame is provided with a handle assembly; the handle assembly comprises a mounting rod and a handle rod; the mounting rod is provided between the two support rods in the width direction of the folding bottom frame, and the handle rod is provided at a middle portion of the mounting rod; each of two ends of the mounting rod is provided with one rotating element; each of the two support rods is provided with one connecting element; a rotating space is formed inside the connecting element; and the rotating element is rotatably provided in the corresponding rotating space.

8. The camping wagon according to claim 7, wherein the mounting rod comprises a left mounting rod, a right mounting rod, and a connecting portion provided between the left mounting rod and the right mounting rod; a first end of the left mounting rod and a first end of the right mounting rod are respectively hinged to corresponding rotating elements; two sides of an upper end surface of the connecting portion are respectively provided with connecting grooves; the connecting grooves extend outward and penetrate outer end surfaces of corresponding ends; a second end of the left mounting rod and a second end of the right mounting rod are respectively hinged in the corresponding connecting grooves; a bottom end of the handle rod is fixedly provided on an upper part of the connecting portion; and when the handle assembly is in an unfolded state, a lower surface of the left mounting rod is abutted against a bottom of the corresponding connecting groove, and a lower surface of the right mounting rod is abutted against a bottom of the corresponding connecting groove.

9. The camping wagon according to claim 1, wherein a first side of each hinge element of the plurality of hinge elements is provided with a first hinge portion, and a second side of each hinge element is provided with a second hinge portion; an upper end surface of the first hinge portion is provided with a support rod mounting through hole, and the support rod mounting through hole penetrates upper and lower end surfaces of the first hinge portion; a front surface of the first hinge portion is provided with a mounting through hole, and the mounting through hole penetrates front and back surfaces of the first hinge portion; the first hinge portion is in an insertion fit with the corresponding support rod through the support rod mounting through hole; when the mounting through hole is aligned with a corresponding through hole of the support rod, the first hinge portion is mounted on the support rod through a fixing element; an upper end surface of the second hinge portion is provided with a mounting groove, and the mounting groove extends outward and penetrates an outer end surface of the second hinge portion; a front surface of the second hinge portion is provided with a pin shaft through hole that penetrates front and back surfaces of the second hinge portion; the pin shaft through hole passes through the mounting groove; one end of each of the two linkage rods is hinged to the corresponding second hinge portion and is provided with a linkage rod through hole; when one end of each of the two linkage rods is located in the mounting groove of the corresponding second hinge portion and the pin shaft through hole is aligned with the linkage rod through hole, each of the two linkage rods is hinged to the corresponding second hinge portion through a pin shaft; one end of each of the two first cross rods is hinged to the corresponding second hinge portion and is provided with a first cross rod through hole; and when one end of each of the two first cross rods is located in the mounting groove of the corresponding second hinge portion and the pin shaft through hole is aligned with the first cross rod through hole, each of the two first cross rods is hinged to the corresponding second hinge portion through a pin shaft.

10. The camping wagon according to claim 9, wherein when each of the two second folding sides frame is in an unfolded state, a lower surface of each of the two first cross rods of the second folding side frame is abutted against a bottom of the corresponding mounting groove, and a lower surface of each of the linkage rods of each of the two second folding side frames is abutted against a bottom of the corresponding mounting groove; and when each of the two first folding side frames is in an unfolded state, a lower surface of each of the two first cross rods of each of the two first folding side frames is abutted against a bottom of the corresponding mounting groove, and a lower surface of each of the linkage rods of each of the two first folding side frames is abutted against a bottom of the corresponding mounting groove.

11. A camping wagon, comprising a camping wagon body, wherein a folding frame of the camping wagon body comprises a folding bottom frame, two first folding side frames, two second folding side frames, and four support rods; each of four corners of the folding bottom frame is provided with one support rod; each of the two first folding side frames is provided between each two adjacent support rods in a width direction of the folding bottom frame, and each of the two second folding side frames is provided between each two adjacent support rods in a length direction of the folding bottom frame; wherein each of the two second folding side frames comprises a first X-shaped moveable frame and two second X-shaped moveable frames, and each of the two first folding side frames comprises a third X-shaped moveable frame; upper side ends of the two second X-shaped movable frames of each of the second folding side frames are respectively hinged to corresponding support rods of the four support rods; and two upper side ends of the third X-shaped movable frame of each of the first folding side frames is respectively hinged to corresponding support rods of the four support rods, wherein each of the two second folding side frames comprise two first cross rods, four second cross rods, and two linkage rods; middle portions of two of the four second cross rods are hinged to form the first X-shaped movable frame, and remaining two of the four second cross rods each is respectively hinged to a corresponding first cross rod of the two first cross rods to form the two second X-shaped movable frames; an upper end of the first cross rod of one of the two second X-shaped movable frames is hinged to an upper end of a corresponding second cross rod of the first X-shaped movable frame, and a lower end of the second cross rod of the one of the second X-shaped movable frames is hinged to a lower end of a corresponding second cross rod of the first X-shaped movable frame; a lower end of the first cross rod of the one of the two second X-shaped moveable frames is hinged to a lower part of a corresponding support rod through a corresponding fifth hinge element of the plurality of hinge elements; a first side end of one of the two linkage rods is hinged to an upper part of the corresponding support rod through a corresponding sixth hinge element of the plurality of hinge elements, and a second side end of the one of the two linkage rods is hinged to an upper end of the second cross rod of the one of the two second X-shaped movable frame; an upper end of the first cross rod of the other second X-shaped movable frame is hinged to the upper end of a corresponding second cross rod of the first X-shaped movable frame, and a lower end of the second cross rod of the other second X-shaped movable frame is hinged to the lower end of a corresponding second cross rod of the first X-shaped movable frame; a lower end of the first cross rod of the other second X-shaped moveable frame is hinged to a lower part of a corresponding support rod through a corresponding seventh hinge element of the plurality of hinge elements; a first side end of the other of the two linkage rods is hinged to an upper part of the corresponding support rod through a corresponding eighth hinge element of the plurality of hinge elements, and a second side end of the other of the two linkage rods is hinged to an upper end of the second cross rod of the other second X-shaped movable frame; and a length of each of the two first cross rods is greater than a length of each of the second cross rods, wherein when each of the two second folding side frames is in a folded state, an upper end surface of each of the two first cross rods of each of the two second folding side frames is flush with an upper end surface of the support rod, or the upper end surface of each of the two first cross rods of each of the two second folding side frames is lower than the upper end surface of the support rod; and a distance between a hinge point of one of the second X-shaped movable frames and the upper end of each of the two first cross rods of the other second X-shaped movable frame matches a distance between the hinge point of one of the second X-shaped movable frames and the upper end of the second cross rod of the other second X-shaped movable frame.

\* \* \* \* \*